UNITED STATES PATENT OFFICE.

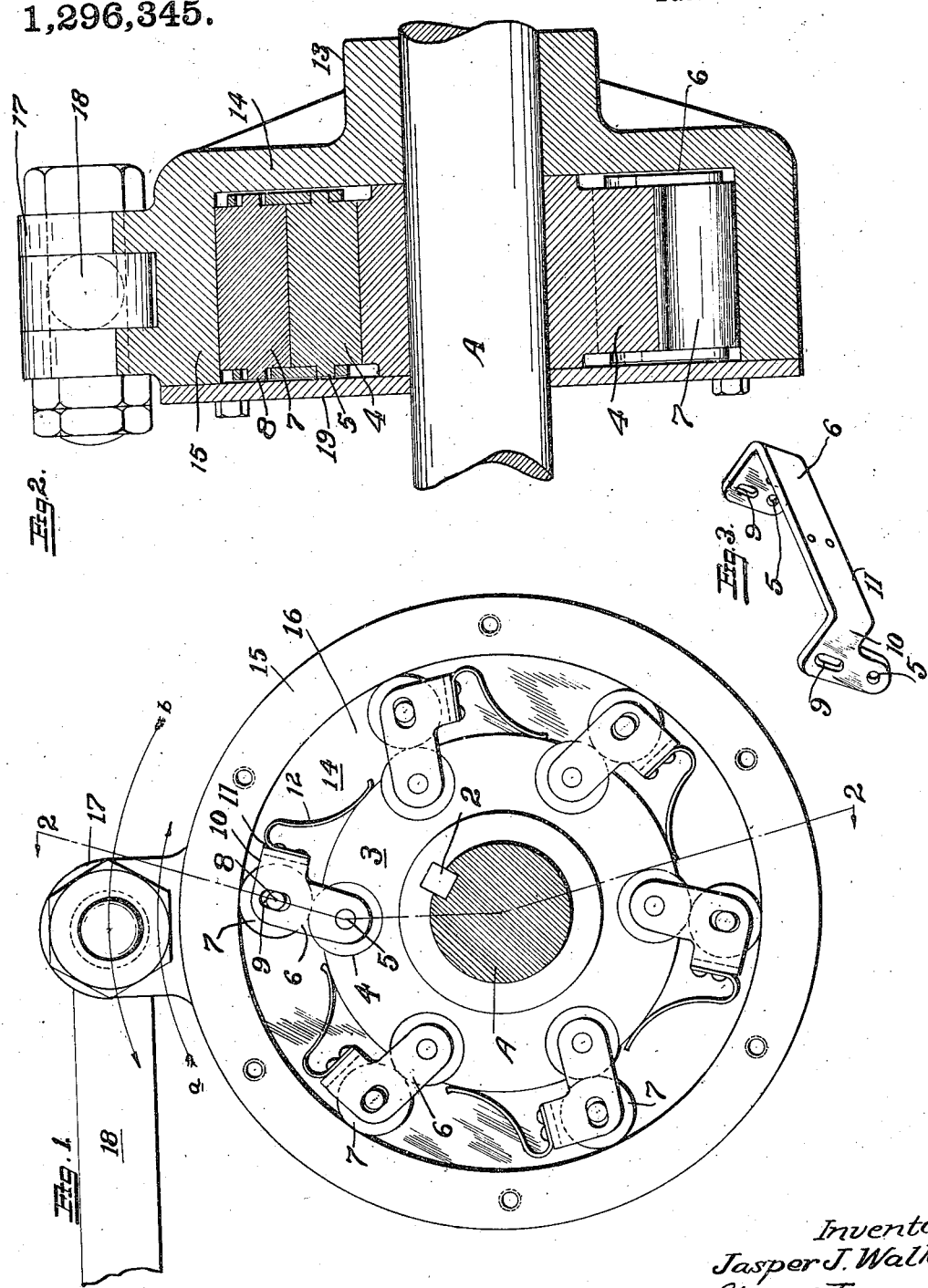

JASPER J. WALK, OF OAKLAND, CALIFORNIA.

ROLLER-CLUTCH.

1,296,345.    Specification of Letters Patent.    Patented Mar. 4, 1919.

Application filed August 7, 1918. Serial No. 248,670.

*To all whom it may concern:*

Be it known that I, JASPER J. WALK, a citizen of the United States, residing at Oakland, in the county of Alameda and State of California, have invented new and useful Improvements in Roller-Clutches, of which the following is a specification.

This invention relates to a roller clutch.

One of the objects of the present invention is to provide a simple, substantial, cheaply manufactured roller clutch in which all cam or eccentric faces may be entirely eliminated, and a large and constantly wearing surface presented.

Another object of the invention is to provide means for maintaining the rollers within the clutch in absolute alinement with the inner and outer clutching faces of the clutch, and to positively prevent angular movement of the same within the clutch.

Another object of the invention is to provide means for maintaining all the rollers within the clutch in clutching position to prevent lost movement or back lash when the clutch is being operated.

Further objects will hereinafter appear.

The invention consists of the parts and the construction and combination of parts as hereinafter more fully described and claimed, having reference to the accompanying drawings in which—

Figure 1 is a side elevation of the clutch showing the cover plate removed.

Fig. 2 is a central vertical cross section on line 2—2, Fig. 1.

Fig. 3 is a perspective view of one of the roller supporting brackets.

Referring to the drawings in detail, A indicates a shaft upon which is secured in any suitable manner, or as here shown by means of a key 2, an inner clutch collar 3. Journaled in the clutch collar as shown are a plurality of rollers 4, in this instance six. Each roller shown is provided with projecting pins 5, one at each end of the roller. The rollers 4 shown will hereinafter be termed "the cam rollers." Pivotally mounted on the projecting pins 5 carried by each cam roller 4 is a U-shaped bracket frame 6, and carried in each bracket frame is a clutch roller 7. The clutch roller 7 shown is also provided with projecting pins, one at each end as at 8, and these pins project through slots 9 formed in the upper ends of the U-bracket for purposes hereinafter to be described. Each U-bracket 6 is offset at the upper end as at 10 to permit a free turning movement of the rollers 7, and also to permit the formation of a connecting arm 11, this arm having two functions: first, that of connecting the arms 6, and secondly, that of forming a support for a spring 12. While any suitable form of spring may be provided I employ a leaf spring, which is bent over to exert its pressure against the clutch collar 3.

Journaled on the shaft as at 13 and freely turnable thereon is a disk 14 by which is carried an outer clutch ring 15. This outer clutch is sufficiently large in diameter to form a space 16 between the clutch collar and the ring to provide ample space for the clutch rollers 7, the U-brackets 6 and the springs 12. The outer clutch member is, in this instance, shown as connected as at 17 with a reciprocating link 18. It is also shown as provided with a grease cover 19 to permit the interior of the clutch to be filled with grease or other lubricants, and furthermore to secure rollers 4 and 7, together with the U-brackets, against endwise movement.

The operation of the clutch is substantially as follows: An oscillating movement transmitted in the direction of arrow $a$ will permit the shaft A and the clutch collar 3 to remain stationary, that is, movement of the outer clutch ring 15 will cause the rollers 7 to turn freely in the same direction and transmit a rotary movement to the cam rollers 4 in the opposite direction, this being due to the fact that the rollers 7 are held snugly against the cam rollers 4 and the inner face of the ring 15 by means of the springs 12. Movement of the clutch section 15 in the opposite direction will, however, immediately cause each roller 7 to reverse, and to immediately form a lock between the cam rollers 4 and the inner face of the clutch 15. This is due to the fact that the rollers 6 are normally maintained a slight distance behind the highest point of the rollers 4, thereby permitting the same to serve as cams which force the rollers 7 outwardly into engagement with the clutch member 15. Movement is thus transmitted to turn the collar 3 and the shaft A only in the direction of arrow $b$. It can furthermore be seen that perfect freedom of movement is permitted the clutch 15 when it is turned in the opposite direction.

While the clutch section 15 is here shown as connected with a link 18, I wish it understood that rotary or oscillating movement may be transmitted thereto in any suitable manner desired, and furthermore that the clutch may be employed for any purpose desired.

The main feature of the present invention is the provision of the cam rollers 4 and the U-brackets 6 by which the rollers 7 are carried. The function of the brackets 6 is to maintain each roller 7 in absolute alinement with the rollers 4, and in alinement with the inner face of the clutch 15. Slotting of the U-brackets 6 as shown at 9 permits considerable swinging movement of the U-brackets without any danger of carrying the roller 7 out of engagement with the inner face of the clutch 15.

Another important feature of the invention is the provision of the rollers 4 as these not only serve the function of cams, but they also provide a large and constantly changing wearing surface for the rollers 7 to engage. By constantly changing wearing surface I mean that the rollers 4 are partly revolved each time the clutch 15 is turned in the direction of arrow $a$. It can therefore be readily seen that the rollers 7 will seldom, if ever, bite into the face of the rollers 4 in exactly the same place as the rotation of the rollers 4 depends entirely upon the amount of rotation imparted to the clutch 15.

Another important feature of the invention is a construction which permits every part employed to be cheaply and readily machined. It furthermore permits the provision of perfectly circular ground faces, and it is, therefore, possible to employ high grade tool steel or similar material which can be case hardened, so that the wearing qualities of the same can be depended upon.

While case hardened steel has here been specified, I wish it understood that the material and finish of the several parts employed may be such as the experience and judgment of the manufacturer may dictate.

Having thus described my invention, what I claim and desire to secure by Letters Patent is:

1. A roller clutch comprising an inner and an outer clutch member, each turnable independent of the other, a plurality of cam rollers carried by the inner clutch, a roller interposed between each cam roller and the outer clutch, and means for maintaining each roller in positive alinement with the outer clutch face and the inner cam rollers.

2. A roller clutch comprising an inner and an outer clutch member, each turnable independent of the other, a plurality of cam rollers carried by the inner clutch, a roller interposed between each cam roller and the outer clutch, means for maintaining each roller in positive alinement with the outer clutch face and the inner cam rollers, and means for maintaining each roller in engagement with the outer clutch and the respective cam rollers.

3. A roller clutch comprising an inner and an outer clutch member, each turnable independent of the other, a plurality of cam rollers journaled in the inner clutch, a roller interposed between each cam roller and the outer clutch, means for maintaining each roller in positive alinement with the outer clutch face and the inner cam rollers, said means comprising a plurality of bracket frames, a pivotal connection between each bracket frame and the inner clutch member, and journals formed at each end of each bracket member for the reception of the rollers.

4. A roller clutch comprising an inner and an outer clutch member, each turnable independent of the other, a plurality of cam members carried by the inner clutch, a roller interposed between each cam member and the outer clutch, means for maintaining each roller in positive alinement with the outer clutch face and the inner cam members, said means comprising a plurality of bracket frames, a pivotal connection between each bracket frame and the inner clutch member, journals formed at each end of each bracket member for the reception of the rollers, and a spring engageable with each bracket member to maintain each roller in engagement with the outer clutch and the respective cam members.

5. A roller clutch comprising an inner and an outer clutch member interspaced with relation to each other, a plurality of rollers journaled in the inner clutch member, a roller interposed between each of said first named rollers and the outer clutch, and means for maintaining each interposed roller in absolute alinement with each first named roller.

6. A roller clutch comprising an inner and an outer annular clutch member, said clutch members being interspaced with relation to each other, a plurality of cam rollers journaled in the inner clutch member, a bracket member pivotally mounted on each cam roller, and clutch roller turnably mounted in each bracket member, and interposed between each cam roller and the outer clutch.

7. A roller clutch comprising an inner and an outer annular clutch member, said clutch members being interspaced with relation to each other, a plurality of cam rollers journaled in the inner clutch member, a bracket member pivotally mounted on each cam roller, a clutch roller turnably mounted in each bracket member, and interposed between each cam roller and the outer clutch, and means engageable with each bracket member to maintain each clutch roller in positive engagement with the outer clutch and the respective cam rollers.

8. A roller clutch comprising an inner and an outer annular clutch member, said clutch members being interspaced with relation to each other, a plurality of cam rollers journaled in the inner clutch member, a bracket member pivotally mounted on each cam roller, a clutch roller turnably mounted in each bracket member, and interposed between each cam roller and the outer clutch, and means engageable with each bracket member to maintain each clutch roller in positive engagement with the outer clutch and the respective cam rollers, said means comprising a spring secured to each bracket member and engageable with the inner clutch.

In testimony whereof I have hereunto set my hand in the presence of two subscribing witnesses.

JASPER J. WALK.

Witnesses:
 JOHN H. HERRING,
 W. W. HEALEY.